United States Patent
Maehara et al.

(10) Patent No.: US 9,348,202 B2
(45) Date of Patent: *May 24, 2016

(54) LAMP UNIT AND PROJECTOR EMPLOYING SAME

(71) Applicant: Hitachi Consumer Electronics Co., Ltd., Tokyo (JP)

(72) Inventors: Hiroshi Maehara, Niiza (JP); Hiroyuki Inoue, Fujisawa (JP); Hideharu Saito, Yokohama (JP); Takashi Omori, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,942

(22) Filed: Aug. 15, 2014

(65) Prior Publication Data

US 2014/0354959 A1    Dec. 4, 2014

Related U.S. Application Data

(63) Continuation of application No. 13/091,670, filed on Apr. 21, 2011, now Pat. No. 8,807,761.

(30) Foreign Application Priority Data

Jun. 4, 2010  (JP) ................................. 2010-128800

(51) Int. Cl.
*G03B 21/18*  (2006.01)
*G03B 21/16*  (2006.01)
*F21V 29/00*  (2015.01)

(52) U.S. Cl.
CPC *G03B 21/16* (2013.01); *F21V 29/40* (2013.01)

(58) Field of Classification Search
CPC ................................ G03B 21/16; F21V 29/00
USPC ..................................................... 353/51–61
See application file for complete search history.

(56) References Cited

U.S. PATENT DOCUMENTS

| 2,293,068 A * | 8/1942 | McLaughlin ................ 251/61.3 |
| 7,210,825 B2 * | 5/2007 | Watanabe et al. ............. 362/373 |

(Continued)

FOREIGN PATENT DOCUMENTS

| CN | 1794084 A | 6/2006 |
| JP | 10-106307 A | 4/1998 |

(Continued)

OTHER PUBLICATIONS

Machine translation of Abstract for JP 2008-226569.*

(Continued)

*Primary Examiner* — William C Dowling
*Assistant Examiner* — Jerry Brooks
(74) *Attorney, Agent, or Firm* — McDermott Will & Emery LLP

(57) ABSTRACT

Cooling air conveyed through a cooling duct 3 is supplied to a discharge lamp 10 via a cooling air exit 21 having a plurality of flow paths 23a to 23c partitioned by a partition plate 22. An air flow direction changeover section 24 changes a flow path through which the discharge lamp is supplied with the cooling air from the cooling air exit. An air flow blocking ball 25 in the air flow direction changeover section moves by its own weight through a guide portion 26 to thereby block the flow path of the cooling air exit. This allows the cooling air to be directed specifically toward an upper side 11a in a direction of gravity of a lamp bulb of the discharge lamp to eliminate a temperature difference, even if a mounting style of the discharge lamp is varied among desk mounting, ceiling mounting, and vertical mounting.

9 Claims, 7 Drawing Sheets

(56) References Cited

U.S. PATENT DOCUMENTS

| | | | |
|---|---|---|---|
| 8,807,761 B2* | 8/2014 | Maehara et al. | 353/61 |
| 2006/0164843 A1 | 7/2006 | Adachi et al. | |
| 2010/0091252 A1* | 4/2010 | Namba et al. | 353/61 |
| 2010/0253924 A1 | 10/2010 | Nishi et al. | |

FOREIGN PATENT DOCUMENTS

| | | | | |
|---|---|---|---|---|
| JP | 2005-024735 A | 1/2005 | | |
| JP | 2005-249930 A | 9/2005 | | |
| JP | 2006-243635 A | 9/2006 | | |
| JP | 2008-226569 | * | 3/2007 | G03B 21/16 |
| JP | 2008-226569 A | 9/2008 | | |
| JP | 2010-078973 A | 4/2010 | | |
| JP | 2011-209382 A | 10/2011 | | |
| WO | 2010/050048 A1 | 5/2010 | | |

OTHER PUBLICATIONS

Japanese Notice of Reasons for Rejection issued in Japanese Patent Application No. JP 2010-128800 dated Jul. 23, 2013.
Office Action Chinese Patent Application No. 201410123247.2 dated Apr. 22, 2015.

* cited by examiner

LAMP UNIT AND PROJECTOR EMPLOYING SAME

CROSS REFERENCE TO RELATED APPLICATION

This application is a continuation of U.S. patent application Ser. No. 13/091,670, filed Apr. 21, 2011, which claims priority from Japanese Patent Application JP P2010-128800 filed on Jun. 4, 2010, the content of which are hereby incorporated by reference into this application.

BACKGROUND OF THE INVENTION

The present invention relates, in general, to a projector including a discharge lamp as a light source to project and display an image and, in particular, to a cooling mechanism for a projector for suitably cooling a light source lamp.

Projectors focuses light emitted from a light source with a reflector, lens, and other parts, let the focused light pass through a display element, such as a liquid crystal panel, to form an optical image, and project the optical image onto, for example, an external screen via a projection lens or a projection mirror. A discharge lamp, such as a high-pressure mercury lamp, is typically used as the light source for the projector. The discharge lamp is substantially hermetically sealed by a reflector on the back and an explosion-proof glass at the front. The discharge lamp tends to become hot when turned ON and is thus designed to be operated at a predetermined appropriate temperature. If the discharge lamp is continuously used at a temperature exceeding the appropriate one, a reduced lamp life could result, or the lamp may explode or fail to turn ON. To prevent the foregoing from happening, the projector typically includes a cooling mechanism that uses a fan for performing forced cooling in order to keep the discharge lamp at the appropriate temperature. An upper portion of a light emitting section, in particular, of the discharge lamp used in the projector tends to become hot, so that the upper portion is specifically cooled to thereby even out temperatures throughout the discharge lamp and maintain the appropriate temperature.

In general, the projector is mounted horizontally on a desk or suspended from a ceiling. When mounted on the desk, the projector very often projects obliquely upwardly. If the projector is mounted on the ceiling in an identical attitude as that when mounted on the desk, the projector projects toward the ceiling. Accordingly, the projector is turned upside down when mounted on the ceiling to thereby project obliquely downwardly. In this case, the discharge lamp inside the projector is also turned upside down. The lamp cooling mechanism is therefore required to maintain the appropriate temperature (temperature distribution) at all times, regardless of whether the projector is mounted on the desk or the ceiling.

A technique disclosed in JP-A-10-106307, for example, is known as one for cooling the discharge lamp of the projector. In the technique disclosed in JP-A-10-106307, a lamp housing for supporting a discharge lamp has opening portions for cooling the lamp at upper and lower portions of one side thereof. The lamp housing further includes a shutter that selects an opening area of the opening portions. The shutter vertically slides to select the opening area according to an attitude of the lamp housing mounted for application. This allows air from a cooling fan to be directed toward the upper portion of the lamp housing, even if the lamp housing is mounted in an upside down attitude.

SUMMARY OF THE INVENTION

There has lately been a need for a projector that can be mounted in an attitude other than those of the abovementioned mounting styles of desk mounting and ceiling mounting according to the application. An example of such a new need is a downward projector that projects downwardly toward, for example, a desk top surface. In this case, the housing of the projector is placed in a vertically upright attitude, so that the discharge lamp in the projector is accordingly placed in a vertical attitude. Such a configuration will hereinafter be referred to as "vertical mounting".

The cooling mechanism disclosed in JP-A-10-106307 has the shutter vertically movable by its own weight, capable of cooling effectively the upper portion, at which the lamp temperature tends to become hot, for desk mounting and ceiling mounting. The cooling mechanism is not, however, effective for vertical mounting. This is because the shutter, which is vertically movable by its own weight, cannot move horizontally. In addition, the very presence of the shutter at the opening portion narrows the opening area, resulting in reduced cooling efficiency for the lamp.

Understandably, a cooling mechanism of an appropriate type (e.g. a cooling fan or a cooling air exit) may be individually provided depending on the applicable mounting style. This, however, leads to a complicated projector structure and thus an increased number of cooling parts used, resulting in increased cost and weight of the projector.

It is an object of the present invention to provide a projector having a cooling mechanism of a simple structure that is applicable to different mounting styles (desk mounting, ceiling mounting, and vertical mounting) of the projector and maintains an appropriate temperature of a discharge lamp by evening out temperatures therethroughout.

An aspect of the present invention provides a projector including a discharge lamp serving as a light source to project and display an image, the projector comprising: a cooling fan for generating cooling air; a cooling duct for conveying the cooling air to the discharge lamp; a cooling air exit for supplying the discharge lamp with the cooling air conveyed through the cooling duct by way of a plurality of flow paths partitioned by a partition plate; and an air flow direction changeover section for changing the flow paths through which the cooling air is supplied from the cooling air exit to the discharge lamp, wherein: the air flow direction changeover section selects the flow path such that the cooling air is directed specifically to an upper side in a direction of gravity of a lamp bulb of the discharge lamp.

Wherein, the cooling air exit is partitioned into three flow paths by two partition plates; and the air flow direction changeover section selects two flow paths on an upper side in the direction of gravity of the three flow paths if a mounting style of the projector is desk mounting or ceiling mounting, and all of the three flow paths if the mounting style of the projector is vertical mounting.

Additionally, the air flow direction changeover section includes an air flow blocking ball that blocks a flow of the cooling air and a guide portion along which the air flow blocking ball moves, the air flow blocking ball moving inside the guide portion by its own weight to thereby block the flow path of the cooling air exit.

According to the aspect of the present invention, regardless of the mounting style of the projector, whether it be the desk mounting, the ceiling mounting, or the vertical mounting, the discharge lamp is free of a temperature difference in a vertical direction and maintained at an appropriate temperature. This achieves not only an extended service life of the discharge lamp, but also a cooling mechanism of a simple structure for the extended service life.

DESCRIPTION OF THE PREFERRED EMBODIMENTS

An embodiment of the present invention will be described hereinafter with reference to the accompanying drawings.

Figure 1:
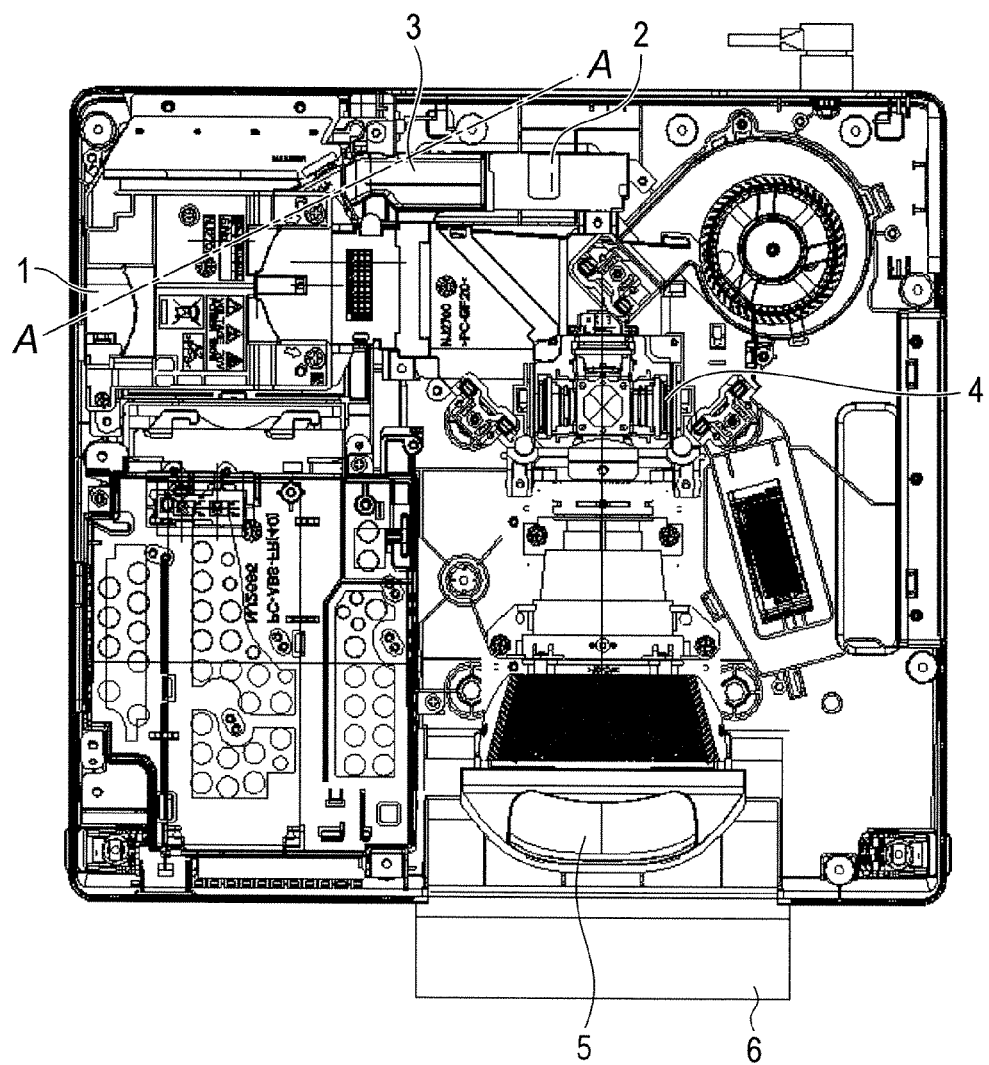
FIG. 1 is a plan view showing an arrangement of an inside of a projector according to an embodiment of the present invention.

FIG. 1 is a plan view showing an arrangement of an inside of a projector according to the embodiment of the present invention. The projector generally includes a lamp unit 1, a cooling duct 2, a cooling fan 3, a liquid crystal panel 4, a projection lens 5, and a projection mirror 6. Specifically, the lamp unit 1 accommodates a discharge lamp. The cooling duct 2 conveys cooling air to the lamp unit 1. The cooling fan 3 generates the cooling air. The liquid crystal panel 4 is a display element for forming an optical image. The projection lens 5 and the projection mirror 6 project the optical image onto, for example, an external screen.

Figure 2:
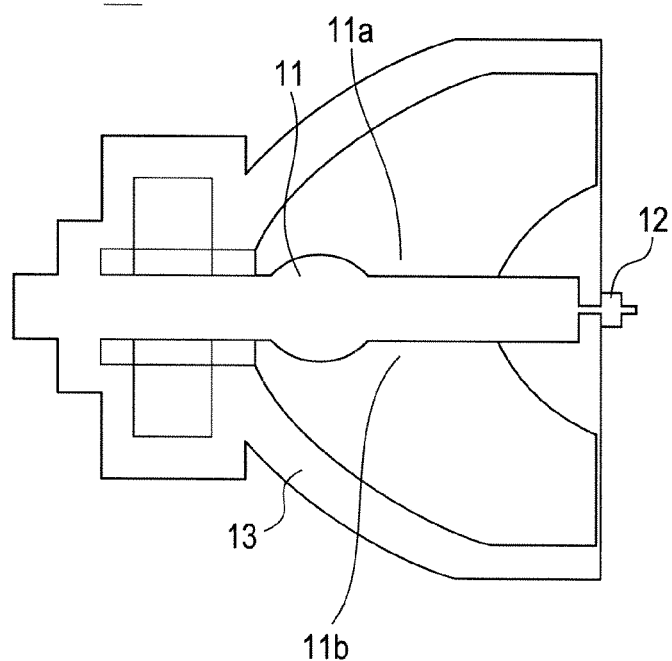
FIG. 2 is a cross-sectional view showing a discharge lamp 10 housed in a lamp unit 1.

FIG. 2 is a cross-sectional view showing a discharge lamp 10 housed in the lamp unit 1. The discharge lamp 10 generally includes a lamp bulb 11, a lamp chip 12 (hereinafter referred to simply as a "chip"), and a reflector 13. Specifically, the lamp bulb 11 (hereinafter referred to simply as a "bulb") serves as a light source. The reflector 13 covers the bulb 11 from the back. When the discharge lamp 10 is turned ON, convection of generated heat causes an upper side 11a of the bulb 11 to become hotter than a lower side 11b thereof at all times. Illuminance retention time of the discharge lamp 10 (lamp life) depends on a difference in temperature between the upper side 11a and the lower side 11b of the bulb 11 in operation. To extend the life of the discharge lamp 10, the difference in temperature between the upper side 11a and the lower side 11b should be minimized. Specifically, the temperature difference may be minimized by specifically cooling the high temperature side of the bulb 11. A specific position suffering from high temperature, however, varies depending on the mounting attitude (mounting style) of the projector. In the embodiment of the present invention, cooling air flow direction control is performed according to the mounting attitude of the projector.

Figure 3:
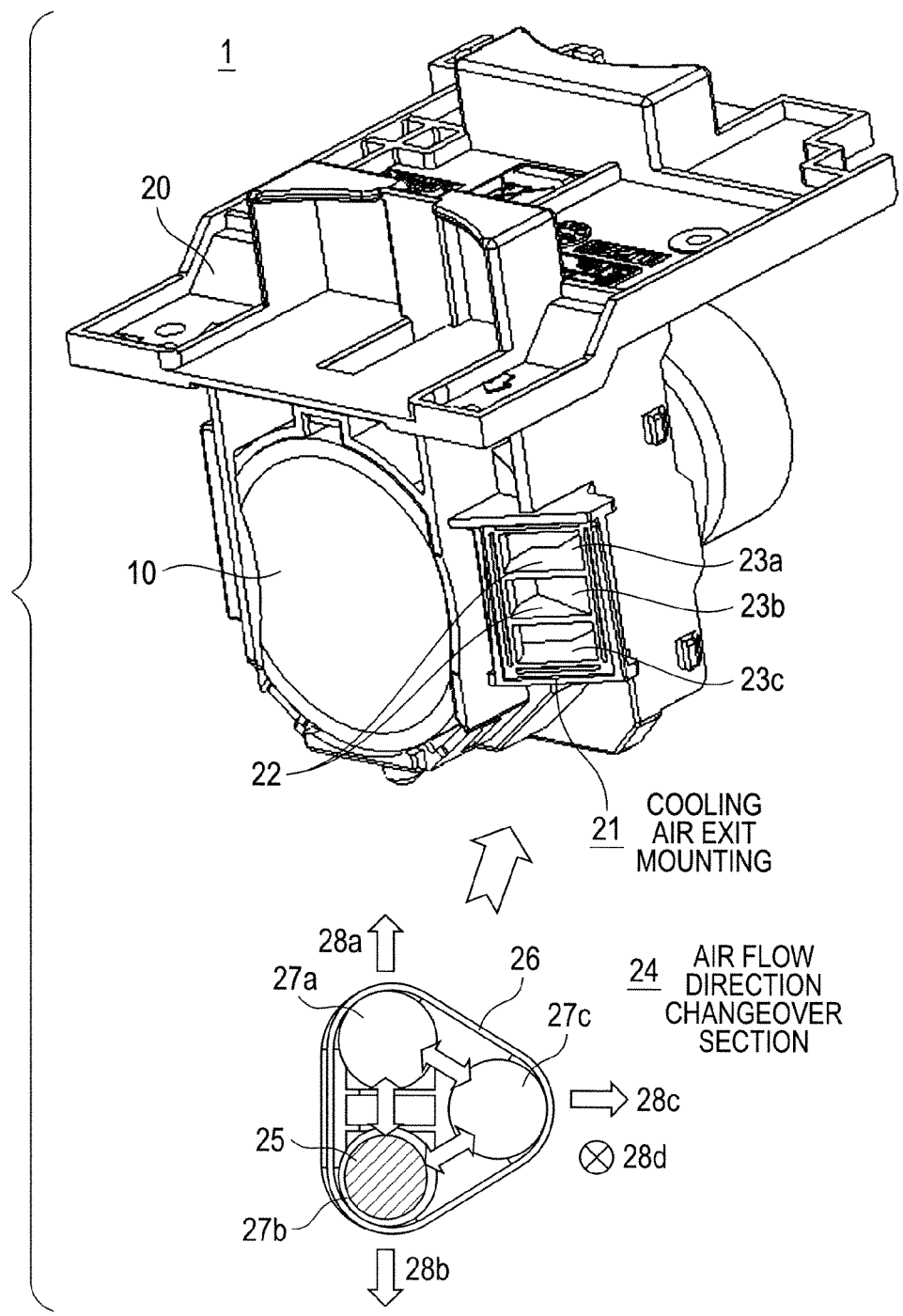
FIG. 3 is a perspective view showing a cooling mechanism disposed near the lamp unit 1.

FIG. 3 is a perspective view showing a cooling mechanism disposed near the lamp unit 1. The discharge lamp 10 is mounted in the projector as by being supported by a lamp housing 20. The lamp housing 20 has a cooling air exit 21 disposed on a side surface thereof. The cooling air exit 21 supplies the discharge lamp 10 with lamp cooling air conveyed through the cooling duct 2. The cooling air exit 21 has an opening portion partitioned by two partition plates 22 and divided into three flow paths 23 arrayed vertically. The three flow paths 23 are labeled 23a, 23b, and 23c, in sequence, from the side of the housing 20 (upper side in FIG. 3) downward. The cooling air is smoothed by the partition plates 22 before being blown out through each of the flow paths 23.

An air flow direction changeover section 24 is disposed before (on a windward side of) the cooling air exit 21. The air flow direction changeover section 24 is used to change a direction in which the lamp cooling air conveyed through the cooling duct 2 blows against the discharge lamp 10. The air flow direction changeover section 24 includes one air flow blocking ball 25 that blocks the flow of the cooling air and a guide portion 26 along which the air flow blocking ball 25 moves. The air flow blocking ball 25 has a diameter larger than a size of the flow path, moving through the guide portion 26 by its own weight. In addition, the air flow blocking ball 25 is prevented from moving onto a leeward side of the cooling air exit 21 by the partition plates 22. The guide portion 26 here forms a substantially triangular moving path and recessed ball receivers such that the air flow blocking ball 25 moves freely according to the direction of gravity that can change in three different directions and rests stably in any of the three different destinations. Specifically, when the direction of gravity is 28a, the air flow blocking ball 25 moves to, and rests in, a destination (rest position) of a ball receiver 27a; when the direction of gravity is 28b, the air flow blocking ball 25 moves to, and rests in, a destination (rest position) of a ball receiver 27b; and when the direction of gravity is 28c, the air flow blocking ball 25 moves to, and rests in, a destination (rest position) of a ball receiver 27c. If the direction of gravity is a direction 28d perpendicular to a paper surface, the moving path to the destination 27c is inclined to make the ball receiver 27c deeper than others, so that the air flow blocking ball 25 moves to the destination 27c. FIG. 3 shows a condition in which the air flow blocking ball 25 moves to, and rests in, the ball receiver 27b when the direction of gravity is the direction of gravity 28b.

When the air flow direction changeover section 24 is to be mounted on the cooling air exit 21, the destinations (ball receivers) 27a and 27b of the guide portion 26 are to be aligned with the flow path 23a and the flow path 23c, respectively, of the cooling air exit 21, with the destination 27c out of any of the flow paths. This results in the flow path 23a being blocked as the air flow blocking ball 25 moves to the destination 27a and the flow path 23c being blocked as the air flow blocking ball 25 moves to the destination 27b, which properly selects the flow path from which the cooling air blows. Note that none of the flow paths is blocked when the air flow blocking ball 25 moves to the destination 27c, so that the cooling air blows out evenly. When the projector changes its mounting attitude, the air flow direction changeover section 24 also changes its attitude. The air flow blocking ball 25 moves in a direction that varies with the direction of gravity at that time, so that the direction of the cooling air blowing can be changed.

As described above, the cooling air exit 21 disposed in the side surface of the lamp housing 20 is divided into three by the partition plates 22 to form the flow paths 23a to 23c and an optimum flow path is selected with the air flow direction changeover section 24 according to the mounting attitude of the projector, to thereby change the direction in which the cooling air blows. Such a cooling mechanism can be achieved through a simple structure having the additional partition plates 22 and the air flow direction changeover section 24.

Figure 4A:
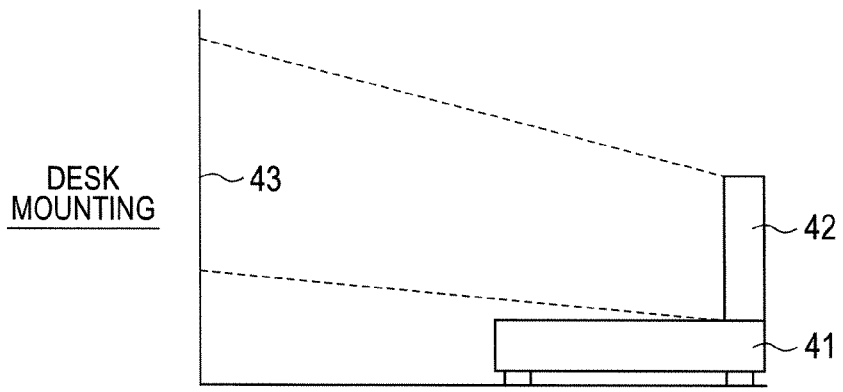
FIG. 4A is an illustration showing desk mounting of the projector.
Figure 4B:
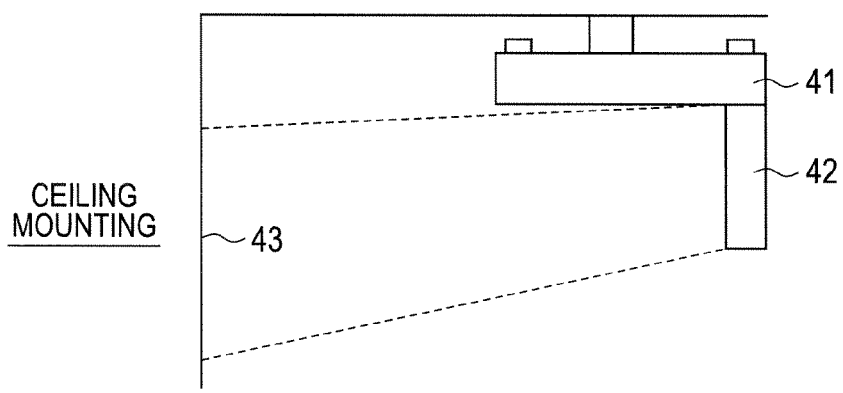
FIG. 4B is an illustration showing ceiling mounting of the projector.
Figure 4C:
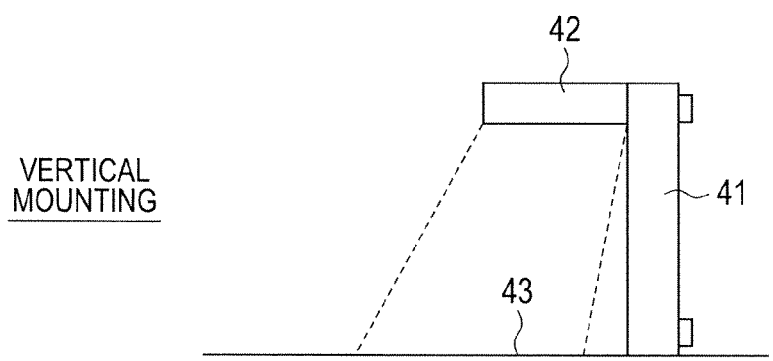
FIG. 4C is an illustration showing vertical mounting of the projector.

FIGS. 4A through 4C are illustrations showing different mounting styles of the projector. In each of FIGS. 4A through 4C, reference numeral 41 denotes a projector, reference numeral 42 denotes a projection mirror, and reference numeral 43 denotes a projection surface.

FIG. 4A is an illustration showing desk mounting, in which the projector 41 is mounted horizontally on a table and an image is projected from the projection mirror 42 toward an upstanding projection surface 43. FIG. 4B is an illustration showing ceiling mounting, in which the projector 41 is suspended by a post from a ceiling and an image is projected from the projection mirror 42 toward an upstanding projection surface 43. FIG. 4C is an illustration showing vertical mounting, in which the projector 41 is mounted vertically on a table that serves also as the projection surface 43 and an image is projected from the projection mirror 42 toward a horizontal projection surface 43.

When the mounting style of the projector 41 changes, the attitude of the lamp unit 1 (discharge lamp 10) built into the projector 41 changes. Specifically, if the lamp unit 1 is disposed as shown in FIG. 1, portions of the upper side in the direction of gravity relative to the bulb 11 change, though the bulb 11 has an axis extending substantially horizontally in each of the mounting styles.

Figure 5A:
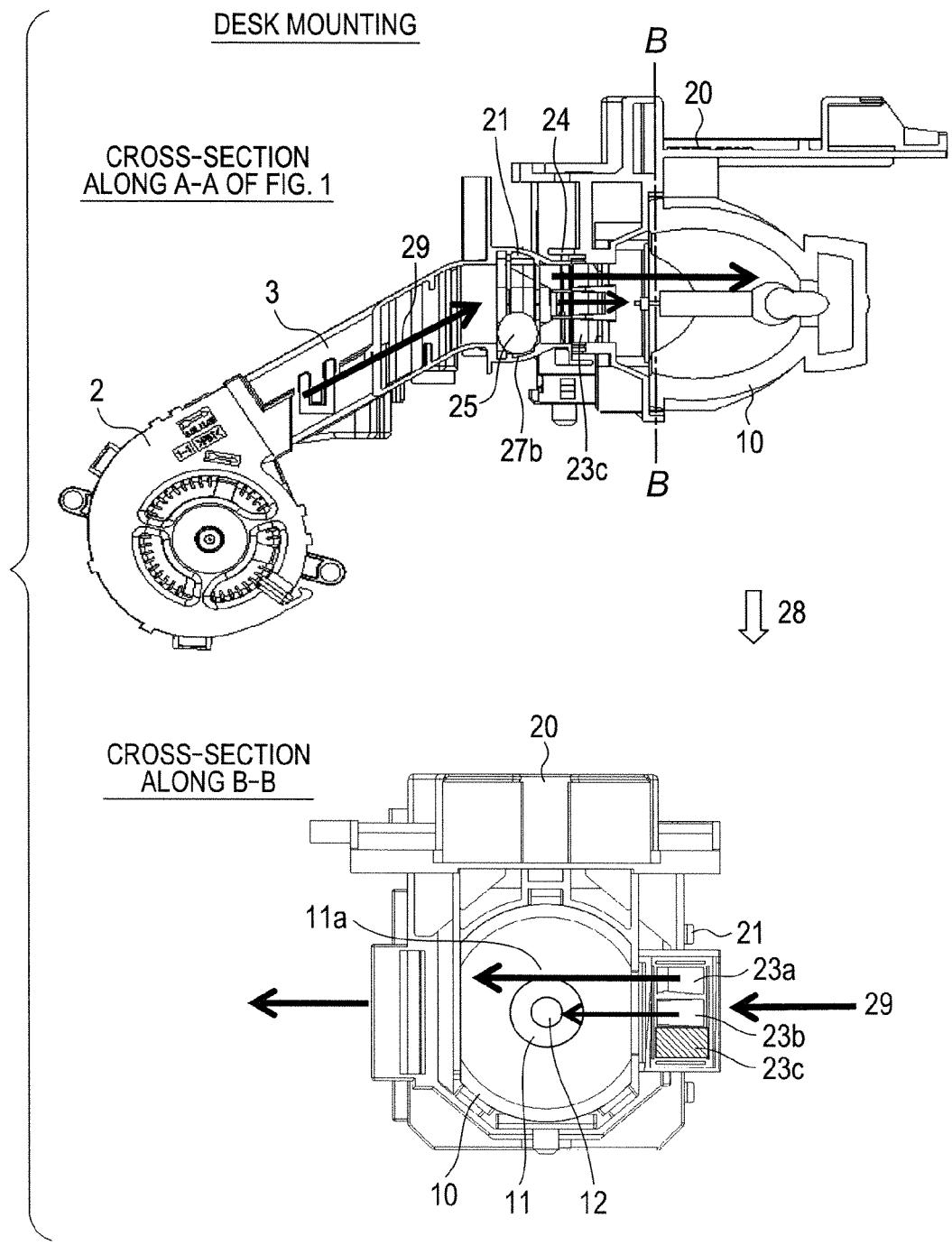
FIG. 5A is an illustration showing flow of cooling air in the projector mounted on a desk.
Figure 5B:
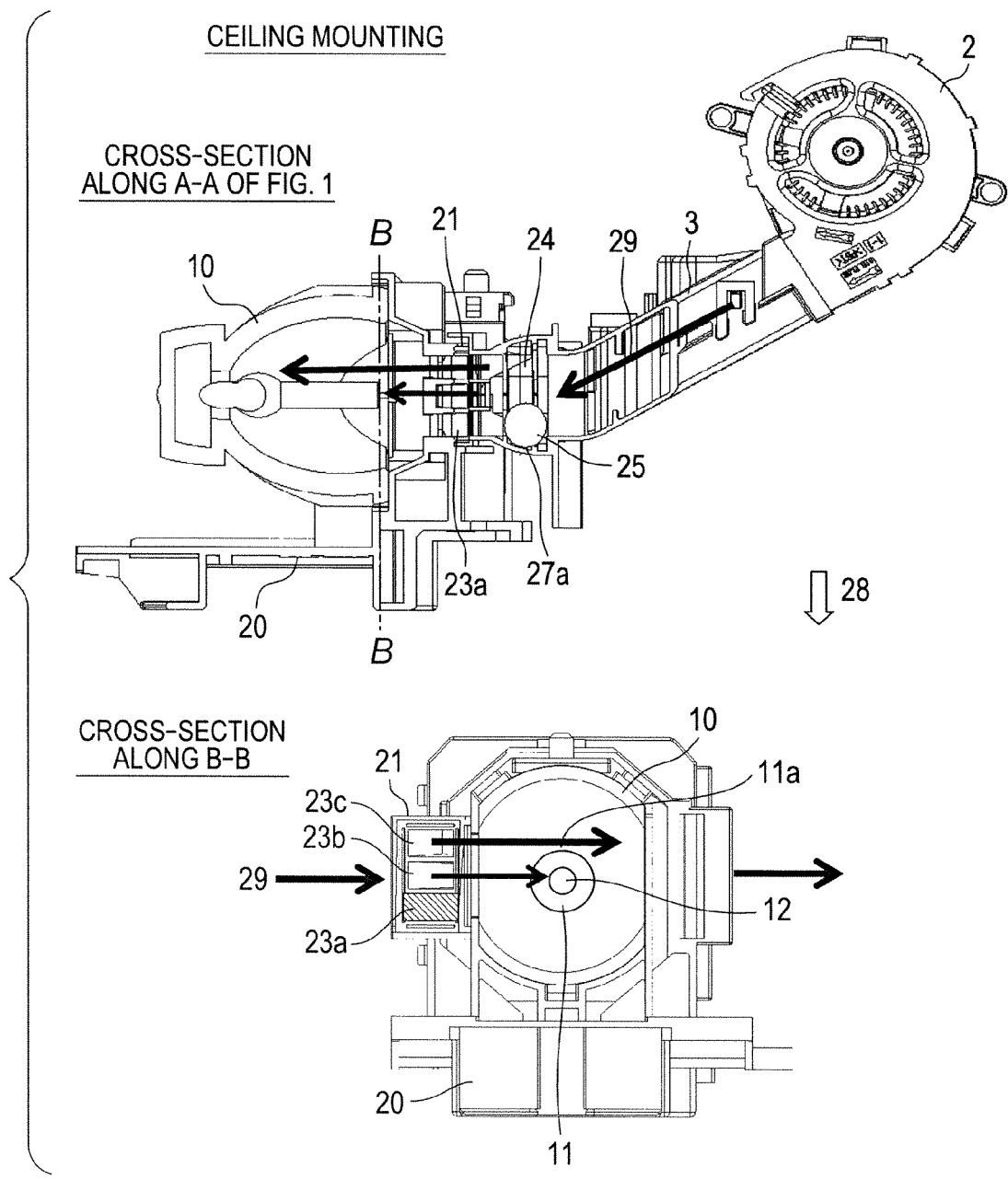
FIG. 5B is an illustration showing flow of cooling air in the projector mounted on a ceiling.
Figure 5C:
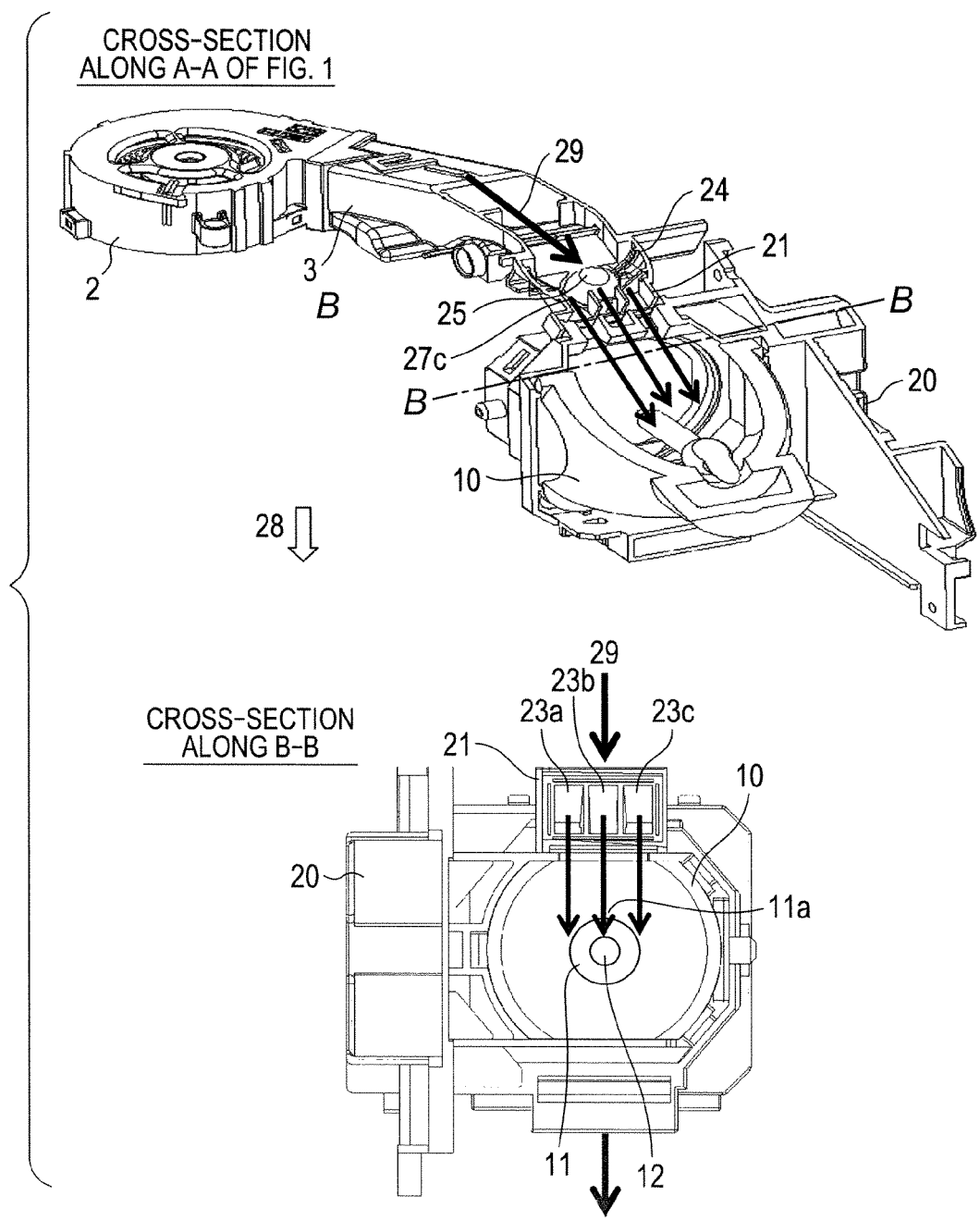
FIG. 5C is an illustration showing flow of cooling air in the projector mounted vertically.

FIGS. 5A through 5C are illustrations showing flow of the cooling air in the projector 41 mounted differently according to the abovementioned mounting styles. Each of FIGS. 5A to 5C is a first cross-sectional view (taken along line A-A in FIG. 1) of the entire lamp cooling mechanism and a second cross-sectional view (taken along line B-B in the first cross-sectional view) of the discharge lamp 10. In FIGS. 5A to 5C, an arrow 28 denotes the direction of gravity and an arrow 29 denotes the flow of the cooling air.

FIG. 5A is an illustration showing the desk mounting, in which the air flow blocking ball 25 in the air flow direction changeover section 24 rests, by its own weight, in the destination 27*b* located downwardly in the direction of gravity inside the guide portion 26. This blocks the lower flow path 23*c* of the cooling air exit 21, so that the upper flow path 23*a* and the middle flow path 23*b* are selected as the exit of the cooling air. Then, the upper side 11*a* of the bulb 11 is cooled with the cooling air from the upper flow path 23*a* and the chip 12 is cooled with the cooling air from the middle flow path 23*b*.

FIG. 5B is an illustration showing the ceiling mounting, in which the cooling air exit 21 and the air flow direction changeover section 24 are turned upside down relative to the attitudes of the cooling air exit 21 and the air flow direction changeover section 24 in the desk mounting of FIG. 5A. The air flow blocking ball 25 in the air flow direction changeover section 24 rests, by its own weight, in the destination 27*a* located downwardly in the direction of gravity inside the guide portion 26. This blocks the lower flow path 23*a* of the cooling air exit 21, so that the upper flow path 23*c* and the middle flow path 23*b* are selected as the exit of the cooling air. Then, the upper side 11*a* of the bulb 11 is cooled with the cooling air from the upper flow path 23*c* and the chip 12 is cooled with the cooling air from the middle flow path 23*b*.

FIG. 5C is an illustration showing the vertical mounting, in which the flow paths 23*a*, 23*b*, 23*c* of the cooling air exit 21 are disposed horizontally, relative to the arrangements of the flow paths 23*a*, 23*b*, 23*c* in the desk mounting shown in FIG. 5A and the ceiling mounting shown in FIG. 5B. At this time, the cooling air exit 21 is adapted to be disposed upwardly in the direction of gravity of the discharge lamp 10 (the bulb 11 and the chip 12). The air flow blocking ball 25 in the air flow direction changeover section 24 rests, by its own weight, in the destination 27*c* located downwardly in the direction of gravity inside the guide portion 26. In this case, none of the flow paths 23*a*, 23*b*, 23*c* is blocked by the air flow blocking ball 25. Specifically, all of the three flow paths 23*a*, 23*b*, 23*c* are selected as the exit of the cooling air. Then, the upper side 11*a* of the bulb 11 is cooled with the cooling air from the left flow path 23*a* and the right flow path 23*c* and the chip 12 is cooled with the cooling air from the middle flow path 23*b*.

Through the air flow direction control of the cooling air as described heretofore, the cooling air can be specifically directed toward the upper side of the bulb that tends to become hot inside the discharge lamp, regardless of the mounting style of the projector, whether it be the desk mounting, the ceiling mounting, or the vertical mounting, to thereby inhibit the temperature from rising and to maintain the appropriate temperature by eliminating the difference in temperature between the upper side and the lower side of the bulb. This achieves not only an extended service life of the discharge lamp, but also a cooling mechanism of a simple structure for the extended service life.

The invention claimed is:

1. A projector which is used in at least two mounting states, comprising:
   a discharge lamp;
   a cooling air discharge section having a cooling air exit partitioned into three discharge ports by two partition plates, the cooling air discharge section discharging cooling air toward the discharge lamp, the discharge of cooling air from the discharge ports being controlled according to the at least two mounting states, the cooling air discharge section including:
   a ball which moves by its own weight according to the mounting states of the projector; and
   a first discharge port, a second discharge port, and a third discharge port for the cooling air,
   a display element which receives a light emitted from the discharge lamp, and
   a projection lens which project a light from the display element,
   wherein:
   the ball moves by its own weight according to a first mounting state and reduces an air flow of the cooling air passing through the first discharge port, and the ball moves by its own weight according to a second mounting state and reduces an air flow of the cooling air passing through the second discharge port.

2. The projector according to claim 1, wherein:
   the cooling air discharge section includes a plurality of ball receiving portions; and
   the respective ball receiving portions correspond to the mounting states of the projector.

3. The projector according to claim 1, wherein:
   the cooling air discharge section includes a first pair of the partition plates and a second pair of the partition plates;
   the first pair of the partition plates are disposed windward of the ball; and
   the second pair of the partition plates are disposed leeward of the ball.

4. The projector according to claim 3, wherein:
   first pair of the partition plates and second pair of the partition plates limit a range of movement of the ball.

5. The projector according to claim 1, wherein the ball is metal.

6. The projector according to claim 1, wherein:
   the ball partially passes the air flow of cooling air passing through the first discharge port, and
   the ball partially passes the air flow of the cooling air passing through the second discharge port.

7. The projector according to claim 1, wherein the partition plates are fixed.

8. The projector according to claim 1, wherein the ball moves by its own weight according to a third mounting state and air flows of the cooling air are provided from the first to third discharge ports, respectively.

9. The projector according to claim 8, wherein the cooling air discharge section includes only the first to third discharge ports for discharging the cooling air to the discharge lump.

* * * * *